US008300617B2

(12) United States Patent
Ogawa

(10) Patent No.: US 8,300,617 B2
(45) Date of Patent: Oct. 30, 2012

(54) SUBSCRIBER STATION, TIME DIVISION MULTIPLEXING SYSTEM AND TRANSMISSION TIMING CONTROL METHOD SUITABLE FOR WIRELESS COMMUNICATION IN SYNCHRONOUS PTOMP SCHEME

(75) Inventor: Takatoshi Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1073 days.

(21) Appl. No.: 12/170,986

(22) Filed: Jul. 10, 2008

(65) Prior Publication Data

US 2009/0016316 A1 Jan. 15, 2009

(30) Foreign Application Priority Data

Jul. 11, 2007 (JP) ................................ 2007-181581

(51) Int. Cl.
*H04B 7/212* (2006.01)
*H04J 3/00* (2006.01)
*H04W 24/00* (2009.01)

(52) U.S. Cl. ......... 370/347; 370/337; 455/424; 455/425

(58) Field of Classification Search .......... 455/516–525, 455/424–425, 561, 63.1, 67.13, 501–503; 375/135–136, 146–150, 346–349; 370/503–508, 370/337, 347
See application file for complete search history.

(56) References Cited

U.S. PATENT DOCUMENTS

| 6,094,576 | A | 7/2000 | Hakkinen et al. | |
|---|---|---|---|---|
| 6,643,295 | B1 | 11/2003 | Nose | |
| 7,945,282 | B2* | 5/2011 | Kang et al. | 455/522 |
| 2004/0174845 | A1* | 9/2004 | Koo et al. | 370/328 |
| 2005/0032536 | A1* | 2/2005 | Wei et al. | 455/517 |
| 2005/0227721 | A1* | 10/2005 | Nakao | 455/510 |
| 2006/0012476 | A1* | 1/2006 | Markhovsky et al. | 340/539.32 |
| 2006/0116153 | A1* | 6/2006 | Sugiyama | 455/522 |
| 2007/0258407 | A1* | 11/2007 | Li et al. | 370/331 |

FOREIGN PATENT DOCUMENTS

| CN | 1698390 A | 11/2005 |
|---|---|---|
| EP | 1458210 A1 | 9/2004 |
| JP | 06-013998 | 1/1994 |
| JP | 11-510667 | 9/1999 |

(Continued)

OTHER PUBLICATIONS

"Part 16: Air Interface for Fixed and Mobile Broadband Wireless Access Systems; Amendment 2: Physical and Medium Access Control Layers for Combined Fixed and Mobile Operation in Licensed Bands and Corrigendum 1", IEEE Computer Society and the IEEE Microwave Theory and Techniques Society, 3 Park Avenue, New York, NY 10016-5996, USA, Feb. 28, 2006, pp. 1-822.

(Continued)

*Primary Examiner* — Thai Hoang
(74) *Attorney, Agent, or Firm* — Sughrue Mion, PLLC

(57) ABSTRACT

A transmitter transmits a ranging request message to a BS. A receiver receives response information in response to the ranging request message transmitted by the transmitter. A controller transmits the ranging request message from the transmitter at a transmission timing which has been previously set. Subsequently, if the receiver has not received the response information in response to the ranging request message within a predetermined period, the controller retransmits the ranging request message earlier than the transmission timing which has been previously set.

8 Claims, 9 Drawing Sheets

FOREIGN PATENT DOCUMENTS

| | | |
|---|---|---|
| JP | 11-331228 | 11/1999 |
| JP | 2000-261371 A | 9/2000 |
| JP | 2001-524268 | 11/2001 |
| JP | 2002-094606 | 3/2002 |
| JP | 2004-254228 A | 9/2004 |
| JP | 2005-130174 A | 5/2005 |
| JP | 2006-072617 A | 3/2006 |
| JP | 2006-115520 A | 4/2006 |
| JP | 2006-515731 A | 6/2006 |
| JP | 2006-303802 | 11/2006 |
| JP | 2006-310483 A | 11/2006 |

OTHER PUBLICATIONS

Chinese Office Action dated Dec. 27, 2011 issued in Chinese Application No. 10021177320.

Office Action issued Mar. 31, 2012 by the State Intellectual Property Office of the People's Republic of China in counterpart Chinese Application No. 200810136150.X.

* cited by examiner

Related Art

Related Art

Related Art

SUBSCRIBER STATION, TIME DIVISION MULTIPLEXING SYSTEM AND TRANSMISSION TIMING CONTROL METHOD SUITABLE FOR WIRELESS COMMUNICATION IN SYNCHRONOUS PTOMP SCHEME

This application is based upon and claims the benefit of priority from Japanese patent application No. 2007-181581, filed on Jul. 11, 2007, the disclosure of which is incorporated herein in its entirety by reference.

BACKGROUND OF THE INVENTION

1. Field of the Invention

The present invention relates to a subscriber station, a time division multiplexing system and a transmission timing control method.

2. Description of the Related Art

In Document 1 (IEEE Standard for Local and metropolitan area networks Part 16: "Air Interface for Fixed and Mobile Broadband Wireless Access Systems Amendment 2", IEEE Std 802.16e-2005 and IEEE Std 802.16-2004/Cor 1-2005, 2006.), a standard for high-speed wireless data communication (IEEE 802.16) has been defined.

In a physical layer in IEEE 802.16, single carrier, OFDM (orthogonal frequency division multiplexing), OFDMA (orthogonal frequency division multiple access) and the like are supported as modulation schemes. Hereinafter, a wireless data communication method compliant with IEEE 802.16 will be described. In addition, it is assumed that the modulation scheme is OFDMA.

In IEEE 802.16, a PtoMP (point-to-multipoint) scheme has been prescribed as one of the communication modes. In the PtoMP scheme, a base station (hereinafter referred to as "BS") performs scheduling of transmission/reception timings of all subscriber stations (hereinafter referred to as "SS") under the BS, which enables improving communication efficiency and guarantee QoS (Quality of Service).

FIG. 1 is a diagram showing a configuration example of an OFDMA frame in the PtoMP scheme of the related art. In the OFDMA frame, a Preamble and an FCH followed by a Down Link Burst are stored. Schedule information for scheduling the transmission/reception timing of the subscriber station (scheduling information for each of Down Link and Up Link) exists in a MAP message included in a broadcast message field within this Down Link Burst.

The scheduling information includes down link slot information and up link slot information to be assigned to each SS. Based on this slot information, the SS can know a timing at which data arrives at the SS itself (reception timing) and a timing at which the SS itself may transmit the data (transmission timing).

Moreover, if the SS connects to a network, the SS performs a process referred to as "ranging" for adjusting a transmission/reception timing and transmission power of the BS and the like. In addition, the SS periodically performs ranging even during connecting to the network.

If the SS connects to the network, the SS performs ranging in an initial ranging period assigned by the MAP message from the BS. In addition, this initial ranging period is assigned by a contention scheme. Moreover, ranging in the initial ranging period is referred to as "initial ranging".

FIG. 2 is a sequence diagram for explaining operations of the BS and the SS when the initial ranging is performed in the related art.

The SS transmits a CDMA Code (code division multiple access code: ranging request) message to the BS in the initial ranging period (step 701).

When the BS has received the CDMA Code message, if adjustment of the transmission timing, the transmission power, a frequency and the like is required for the SS, the BS transmits information thereof to the SS by means of RNG-RSP (ranging response) including a ranging continued notification (Ranging Status=continue in the RNG-RSP) (step 702).

When the SS has received the RNG-RSP, the SS adjusts the transmission timing, the transmission power, the frequency and the like based on the RNG-RSP. Subsequently, the SS transmits the CDMA Code message to the BS again in the initial ranging period assigned to the SS by the BS (step 703).

Moreover, if adjustment is not required for the SS, the BS transmits the RNG-RSP including a ranging success notification (Ranging Status=success in the RNG-RSP) to the SS (step 704).

When the SS receives the RNG-RSP including the ranging success notification, the initial ranging is completed.

The related art of a communication system for performing such ranging is described in, for example, Document 2 (Japanese Patent Laid-Open No. 2002-94606), Document 3 (Japanese Patent Laid-Open No. 06-013998), Document 4 (Japanese Patent Laid-Open No. 2006-303802), Document 5 (Japanese Patent Laid-Open No. 11-331228), Document 6 (National Publication of International Patent Application No. 2001-524268), and Document 7 (National Publication of International Patent Application No. 1999-510667).

However, if the size of a cell of the BS becomes large, and PtoMP communication over great distances or PtoP (Point to Point) communication over great distances is executed, there will be a problem in which the initial ranging may fail.

Hereinafter, this problem will be described in detail. FIG. 3 is a configuration diagram showing an example of a communication system in which this problem occurs. In addition, in FIG. 3, a time division multiplexing system is used as the communication system.

In FIG. 3, the time division multiplexing system includes BS 801 and SS 802 to 804. BS 801 mutually communicates with each of SS 802 to 804. Moreover, distances between BS 801 and respective SS 802 to 804 are different from one another. Hereinafter, it is assumed that the distance between BS 801 and SS 802 is A, the distance between BS 801 and SS 803 is B, and the distance between BS 801 and SS 804 is C. Moreover, it is assumed that A<B<C is satisfied.

Since the distances between BS 801 and respective SS 802 to 804 are different from one another, propagation distances of the CDMA Code messages transmitted to BS 801 by respective SS 802 to 804 are different from one another. Thus, propagation delay times between BS 801 and respective SS 802 to 804 are different from one another. Therefore, the optimum transmission timings for the CDMA Code messages in respective SS 802 to 804 are different from one another.

FIG. 4 is an explanatory diagram for explaining an example of the transmission timing of the SS of the related art. In FIG. 4, it is assumed that a distance between BS 201 and SS 202 is significantly large.

When time 204 which has been previously defined has elapsed since the time when SS 202 received beginning 203 of Down Link data from BS 201, SS 202 transmits CDMA Code message 206 to BS 201. Here, since the distance between BS 201 and SS 202 is significantly large, CDMA Code message 206 arrives at BS 201 at time 208 beyond time 209 in which BS 201 can receive the message.

As seen from this example, when the communication (the PtoMP communication or the PtoP communication) over great distances is executed, even if the SS has transmitted the CDMA Code message in the initial ranging period, the CDMA Code message may not arrive at the BS at the time at which the BS can receive the message. If the CDMA Code does not arrive at the BS in the time in which the BS can receive the message, the initial ranging fails.

Here, it is conceivable that this problem can be solved if the transmission timing for the CDMA Code message in the SS is changed depending on the distance between the SS and the BS. However, the BS is required to precisely comprehend the distance to the SS, thus taking a lot of trouble.

Moreover, in IEEE 802.16 described in Document 1, a technique has been proposed in which failure of the initial ranging can be prevented without changing the transmission timing for the CDMA Code message depending on the distance between the SS and the BS. In this technique, a redundancy referred to as "Guard interval" is added to an OFDM symbol. Thereby, even if the time of receiving the CDMA Code message in the BS has been shifted from the time at which the CDMA Code message can be received, using a Guard interval time secured at the Guard interval, the shift can be absorbed. In other words, even if the time of receiving the CDMA Code message has been shifted from the time in which the CDMA Code message can be received, using Guard interval time, the CDMA Code message can be received. Thus, it is possible to prevent failure of the initial ranging.

Here, in order to absorb a large shift, it is necessary to set the Guard interval to be large and have a long Guard interval time. However, if the Guard interval is increased, a data area for one OFDM symbol becomes narrow. This is because a length of the OFDM symbol having the data area and the Guard interval has been previously defined. Therefore, a method of increasing the Guard interval cannot be said to be a preferred method since the data transmission amount for one OFDM symbol is decreased. Moreover, primarily, in a communication system in which the Guard interval cannot be set, the shift cannot be absorbed.

Document 2 describes a communication subscriber station apparatus capable of receiving the CDMA Code without setting the Guard interval in the case where communication over great distances is performed.

This communication subscriber station apparatus measures receiving electric field strength from a base station, and based on the measured received electric field strength, an initial value of a transmission timing with respect to the base station is determined. Then, the communication subscriber station apparatus transmits a signal while shifting the transmission timing, and thereby searches for a transmission timing at which the base station can receive the signal.

Thereby, it is possible to receive the CDMA Code message without the Guard interval being set.

However, the communication subscriber station apparatus described in Document 2 has to include means for measuring the receiving electric field strength and means for obtaining the initial value of the transmission timing based on the receiving electric field strength, thereby causing a problem the configuration of the apparatus becomes complicated.

Moreover, in the communication system performing the ranging, if communication over great distances is executed, there is another problem, as follows, in addition to the above described problem in which the initial ranging fails. In other words, there is a problem in which the reception time of receiving the data from the BS and the transmission time of transmitting the data to the BS overlap in the SS.

FIG. 5 is an explanatory diagram showing an example in which the reception time and the transmission time overlap in the time division multiplexing system of the related art. In FIG. 5, it is assumed that the distance between BS 301 and SS 302 is larger than distances between BS 301 and other SS (SS 311 and 312).

In FIG. 5, reference numeral D1 (303) denotes a Down Link data area with respect to SS 311, reference numeral D2 (304) denotes a Down Link data area with respect to SS 312, and reference numeral D3 (305) denotes a Down Link data area with respect to SS 302.

If the distance between BS 301 and SS 302 is large, as shown in FIG. 5, at SS 302, the transmission timing for Up Link data may occur by the time that reception of data area D3 (305) from BS 301 has been completed.

Specifically, BS 301 does not consider which position within a Down Link frame the Down Link data area with respect to SS 302 is mapped at. Thus, if data with respect to SS 302 has been mapped at the portion of the behind the Down Link frame (data area D3 (305)), the reception time for data area D3 (305) and the transmission time for an Up Link frame overlap.

Thus, there has been a problem in which data cannot be correctly received.

Document 3 describes a method of assigning transmission time slots in which the data areas within the Down Link frame and the Up Link frame are assigned so that such overlap may be prevented.

However, since Document 3 does not include the above described configuration for shifting the transmission timing, there is a case where the CDMA Code message cannot be received.

Furthermore, Documents 1 and 4 to 7 do not describe means for solving the above described problem in which the CDMA Code cannot be received.

SUMMARY OF THE INVENTION

It is an object of the present invention to provide a subscriber station, a time division multiplexing system and a transmission timing control method which solve the above described problem, that is, a problem in which an apparatus configuration becomes complicated when a ranging request message is enabled to be received.

A subscriber station according to the present invention is a subscriber station communicable with a base station, including a transmitter for transmitting a ranging request message, a receiver for receiving response information in response to the ranging request message transmitted by the above described transmitter, and a controller for transmitting the above described ranging request message from the above described transmitter at a transmission timing which has been previously set, and subsequently, if the above described receiver has not received the response information in response to the above described ranging request message within a predetermined period, retransmitting the above described ranging request message from the above described transmitter earlier than the next above described transmission timing.

Moreover, a time division multiplexing system according to the present invention is a time division multiplexing system including a base station and a subscriber station communicable with the above described base station, wherein the above described subscriber station includes a transmitter for transmitting a ranging request message, a receiver for receiving response information in response to the ranging request message transmitted by the above described transmitter, and a controller for transmitting the above described ranging request message from the above described transmitter at a transmission timing which has been previously set, and subsequently, if the above described receiver has not received the response information in response to the above described ranging request message within a predetermined period, retransmitting the above described ranging request message from the above described transmitter earlier than the next above described transmission timing, and the above described base station includes a base station transmitter, a base station receiver for receiving the above described ranging request message, and a base station controller for, if the above described base station receiver has received the above described ranging request message, transmitting the above described response information from the above described base station transmitter.

Moreover, a first transmission timing control method according to the present invention is a transmission timing control method by a subscriber station communicable with a base station, including transmitting a ranging request message at a transmission timing which has been previously set, and subsequently, if response information in response to the above described ranging request message has not been received within a predetermined period, retransmitting the above described ranging request message earlier than the next above described transmission timing.

Moreover, a second transmission timing control method according to the present invention is a transmission timing control method by a time division multiplexing system including a base station and a subscriber station communicable with the above described base station, wherein the above described subscriber station transmits a ranging request message, and if the above described base station has received the above described ranging request message, the above described base station transmits response information in response to the above described ranging request, and after the above described subscriber station has transmitted the above described ranging request, if the above described subscriber station has not received the above described response information within a predetermined period, the above described subscriber station retransmits the above described ranging request message earlier than the next above described transmission timing.

Moreover, a program according to the present invention causes a computer connected to a base station to execute a procedure for transmitting a ranging request message at a transmission timing which has been previously set, and a procedure for, after the above described ranging request has been transmitted, if response information in response to the above described ranging request message has not been received within a predetermined period, retransmitting the above described ranging request message earlier than the next above described transmission timing.

The above and other objects, features, and advantages of the present invention will become apparent from the following description with reference to the accompanying drawings which illustrate examples of the present invention.

DETAILED DESCRIPTION OF THE PREFERRED EMBODIMENTS

Hereinafter, exemplary embodiments will be described with reference to the drawings.

Figure 1:
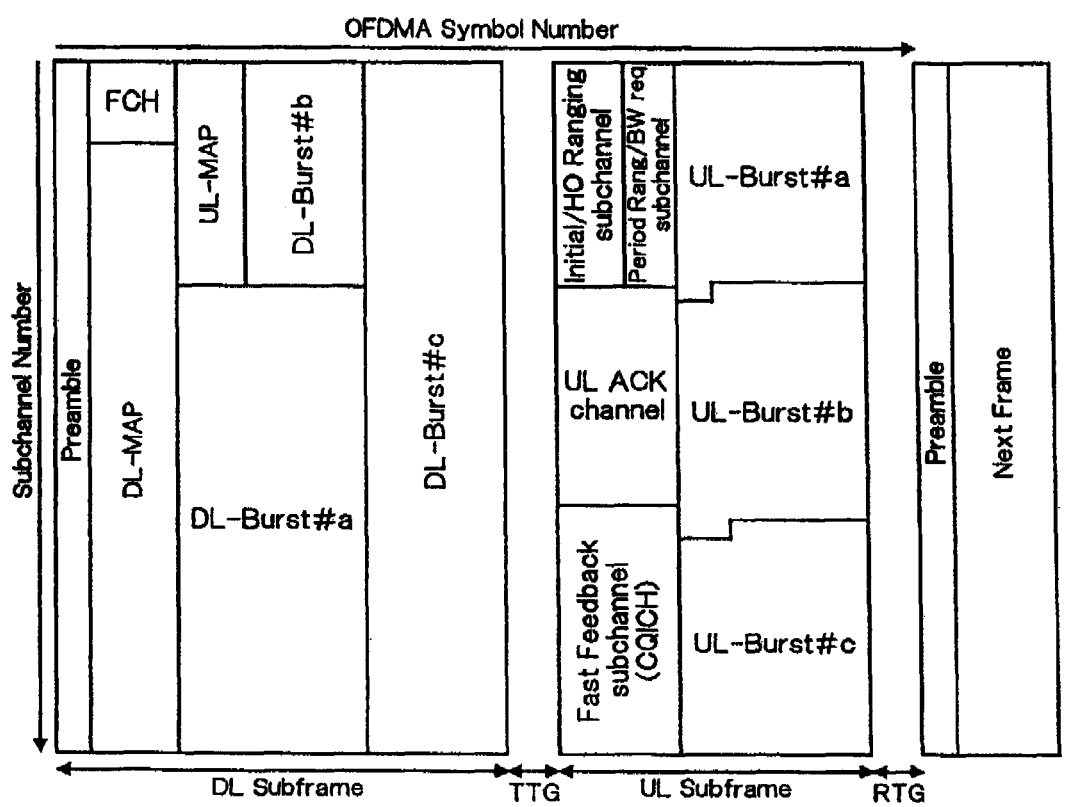
FIG. 1 is a diagram showing an example of an OFDMA frame configuration in a PtoMP scheme of the related art.
Figure 2:
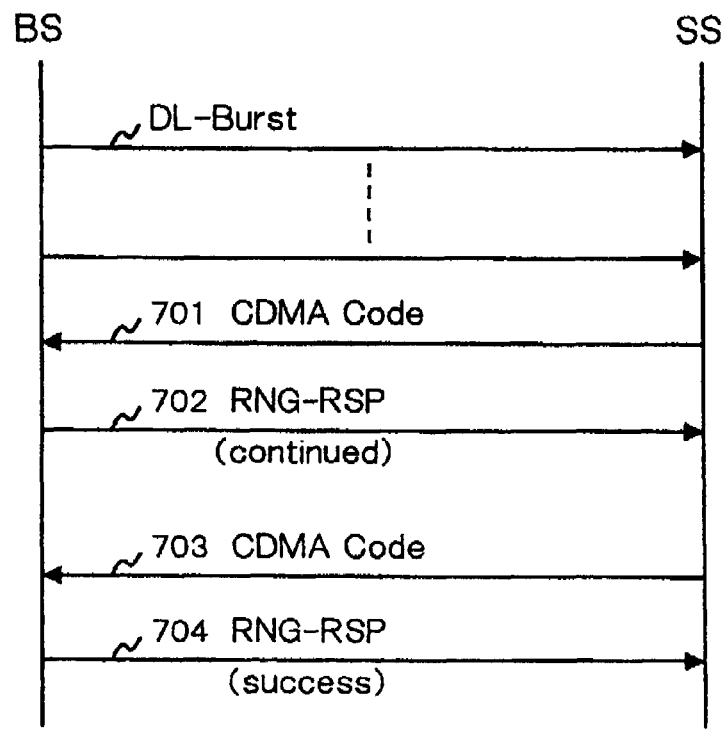
FIG. 2 is a sequence diagram for explaining operations of a BS and an SS when initial ranging is performed in the related art.
Figure 3:
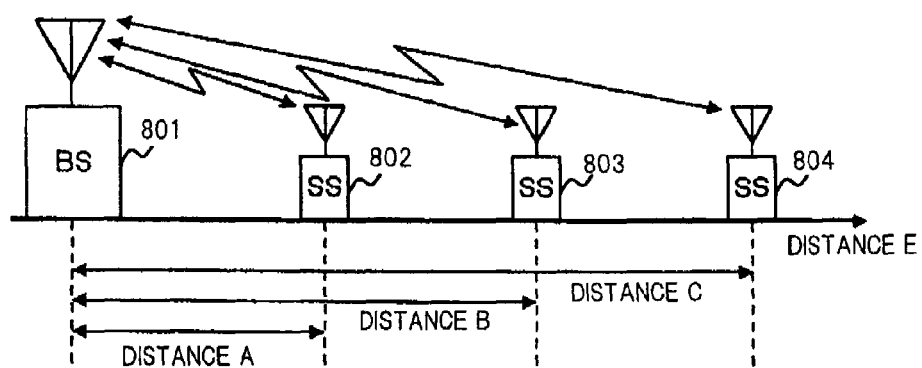
FIG. 3 is a configuration diagram of an example of a time division multiplexing system of the related art.
Figure 4:
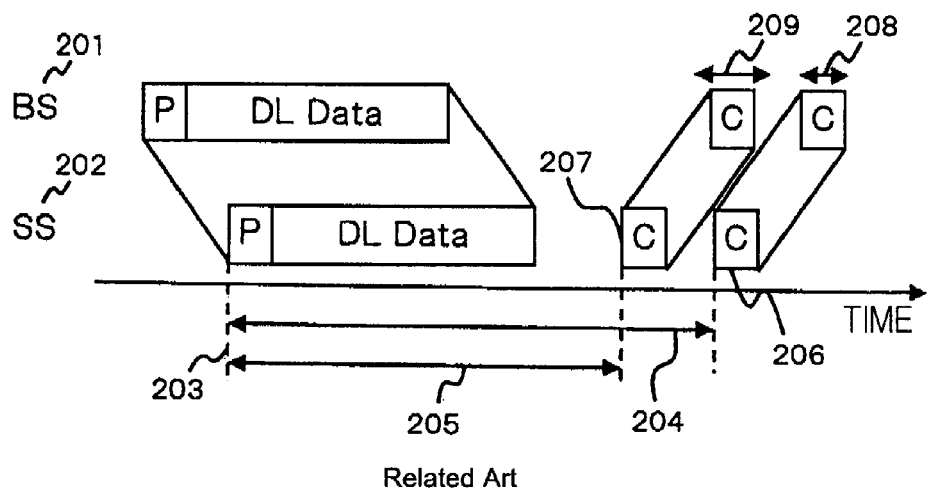
FIG. 4 is an explanatory diagram for explaining an example of a transmission timing of the SS of the related art.
Figure 5:
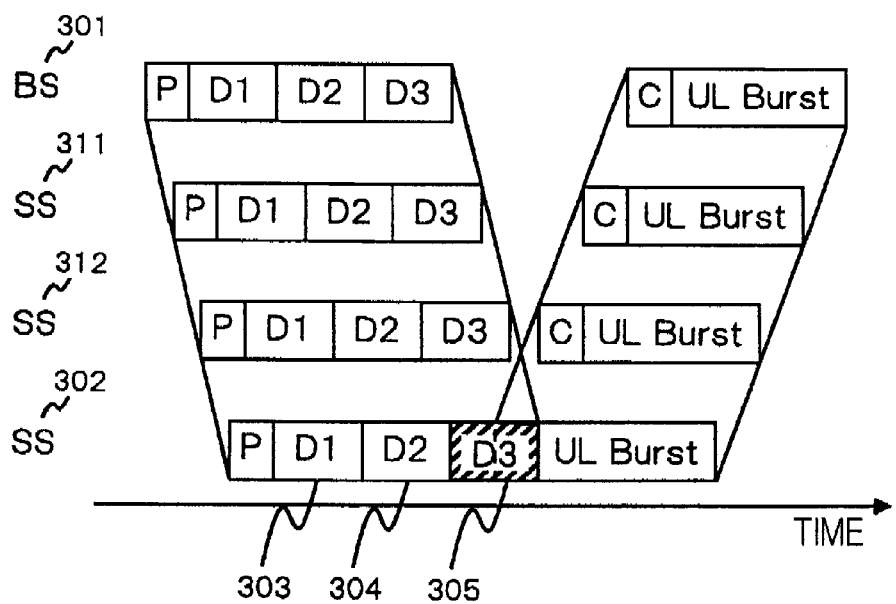
FIG. 5 is an explanatory diagram showing an example in which a reception time and a transmission time overlap in the time division multiplexing system of the related art.
Figure 6:
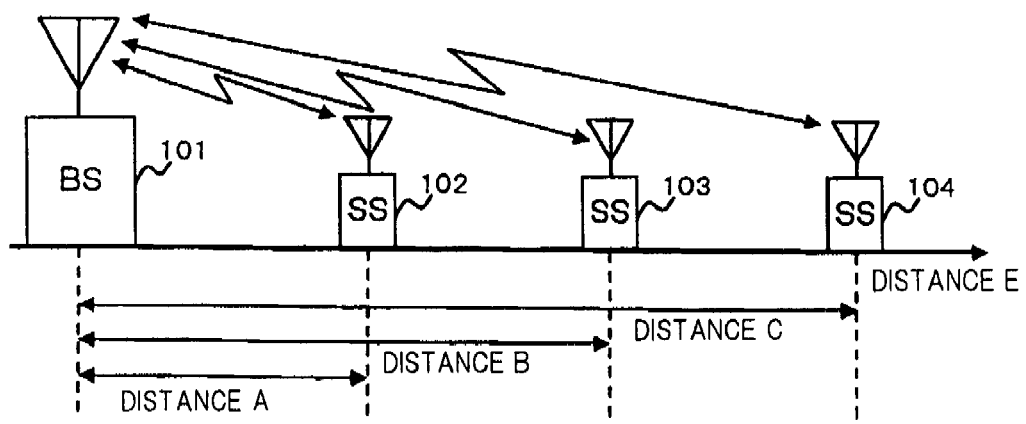
FIG. 6 is a block diagram showing a time division multiplexing system of a first exemplary embodiment.

FIG. 6 is a block diagram showing a time division multiplexing system of a first exemplary embodiment. In FIG. 6, the time division multiplexing system includes BS (base station) 101 and SS (subscriber stations) 102 to 104. BS 101 can mutually communicate with each of SS 102 to 104.

Hereinafter, it is assumed that the distance between BS 101 and SS 102 is A, the distance between BS 101 and SS 103 is B, and the distance between BS 101 and SS 104 is C. Moreover, it is assumed that A<B<C is satisfied. Moreover, it is assumed that each of SS 102 and 103 is placed at a position at which initial ranging can be normally completed at a transmission timing which has been previously set for the SS, and SS 104 is placed at a position at which the initial ranging cannot be normally completed at a transmission timing which has been previously set for the SS.

Figure 7:
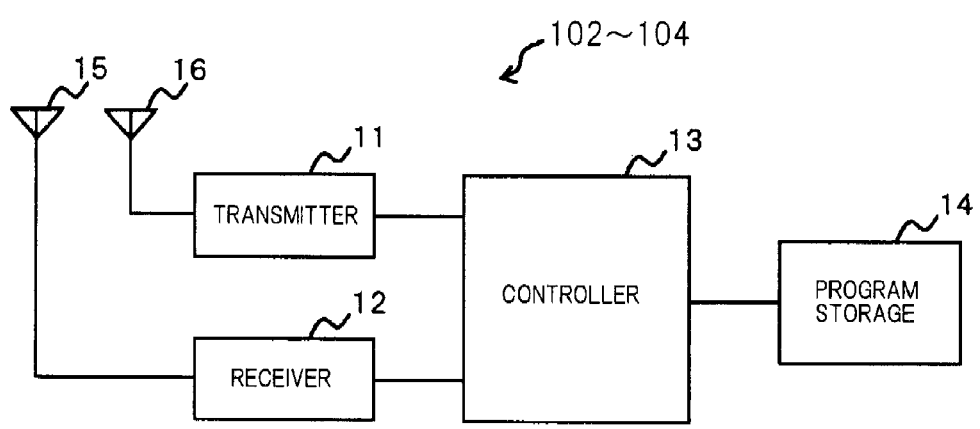
FIG. 7 is a block diagram showing a configuration example of a subscriber station.

FIG. 7 is a block diagram showing a configuration example of SS 102 to 104. In addition, all of SS 102 to 104 include the same configuration.

In FIG. 7, SS 102 to 104 include transmitter 11, receiver 12, controller 13, program storage 14, receiver antenna 15 and transmitter antenna 16.

Transmitter 11 transmits a CDMA Code (ranging request) message to BS 101.

Receiver 12 receives a Down Link MAP message (DL-Burst) from BS 101. The MAP message includes schedule information indicating a signal transmission timing in the SS.

Moreover, receiver 12 receives response information (RNG-RSP) in response to the CDMA Code message transmitted by transmitter 11, from BS 101. As the response information, there is continued response information (RNG-RSP (continued)) indicating continuation of ranging, and success response information (RNG-RSP (success)) indicating success of the ranging.

Controller 13 is, for example, a CPU, and reads a transmission timing control program stored in program storage 14 and executes the program to perform the following process.

When receiver 12 receives the MAP message, controller 13 sets the transmission timing indicated by the schedule information in the MAP message as an initial ranging period in itself (controller 13). Thereby, in controller 13, the transmission timing is previously set by BS 101 prior to the transmission of the CDMA Code message.

Controller 13 transmits the CDMA Code message from transmitter 11 at the set transmission timing.

After controller 13 has transmitted the CDMA Code message, if receiver 12 has not been able to receive the response information in response to the CDMA Code message within a predetermined period, controller 13 increases transmission power for the CDMA Code message. Controller 13 retransmits the CDMA Code message from transmitter 11 using the increased transmission power, at the next transmission timing.

After controller 13 has retransmitted the CDMA Code message, if receiver 12 has not been able to receive the response information in response to the CDMA Code message within the predetermined period, controller 13 retransmits the CDMA Code message from transmitter 11 earlier than the next transmission timing.

Moreover, when receiver 12 receives the continued response information as the response information, controller 13 adjusts the transmission timing, the transmission power and the like based on the continued response information.

Furthermore, when receiver 12 receives the success response information as the response information, controller 13 completes the ranging.

Figure 8:
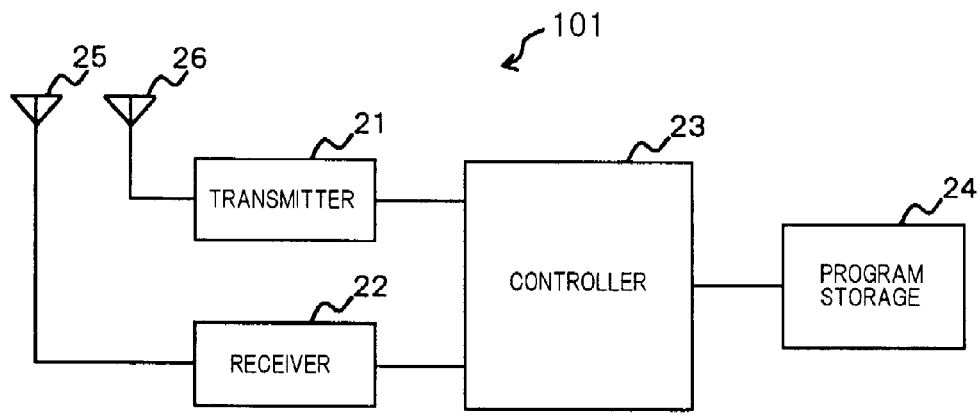
FIG. 8 is a block diagram showing a configuration example of a base station.

FIG. 8 is a block diagram showing a configuration example of BS 101. In FIG. 8, BS 101 includes transmitter 21, receiver 22, controller 23, program storage 24, receiver antenna 25 and transmitter antenna 26.

Receiver 22 receives the CDMA Code message from each of SS 102 to 104.

Transmitter 21 transmits the response information in response to the CDMA Code message received by receiver 22, to the SS which has transmitted the CDMA Code message.

Moreover, transmitter 21 transmits the Down Link MAP message to each of SS 102 to 104.

Controller 23 is, for example, a CPU, and reads the transmission timing control program from program storage 24 and executes the read program to perform the following process.

Based on the ranging request received by receiver 22, controller 23 determines whether or not the SS which has transmitted the ranging request can be accepted. In other words, controller 23 determines whether or not adjustment of the transmission timing, the transmission power, a frequency and the like is required for the SS, based on the ranging request.

If adjustment thereof is required, controller 23 determines that the SS cannot be accepted, and transmits the continued response information from transmitter 21. On the other hand, if adjustment thereof is not required, controller 23 determines that the SS can be accepted, and transmits the success response information from transmitter 21.

Figure 9:
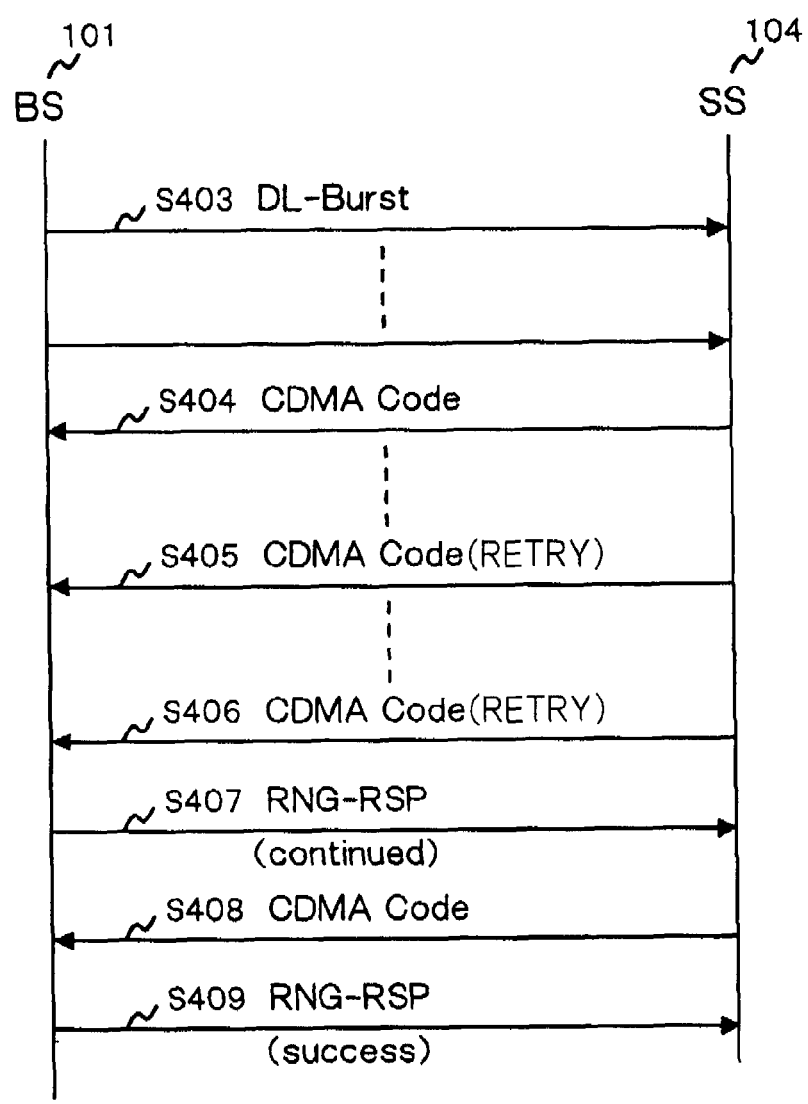
FIG. 9 is a sequence chart for explaining an operation of the time division multiplexing system of the first exemplary embodiment.
Figure 10:
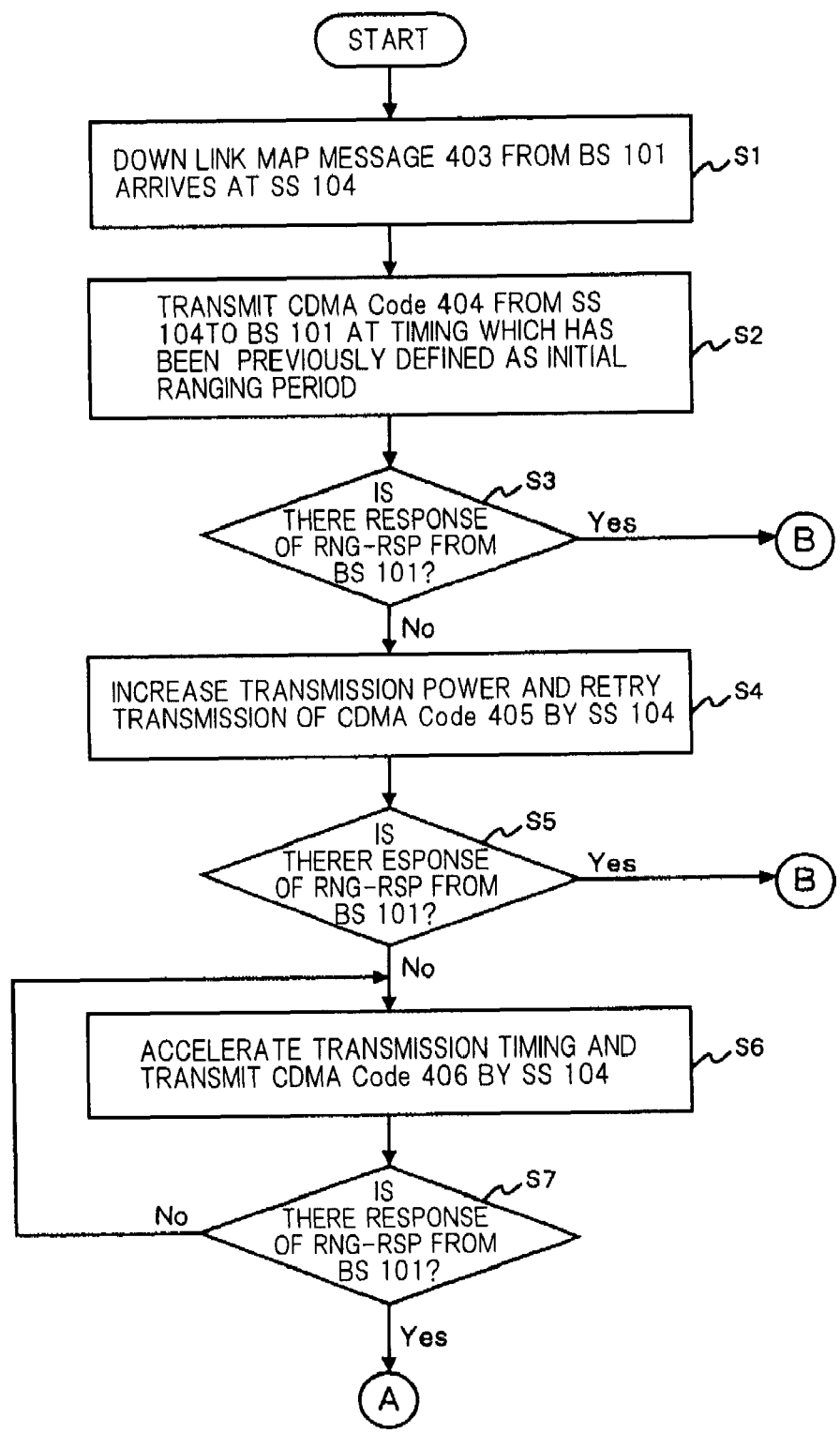
FIG. 10 is a flowchart for explaining the operation of the time division multiplexing system of the first exemplary embodiment (first half)
Figure 11:
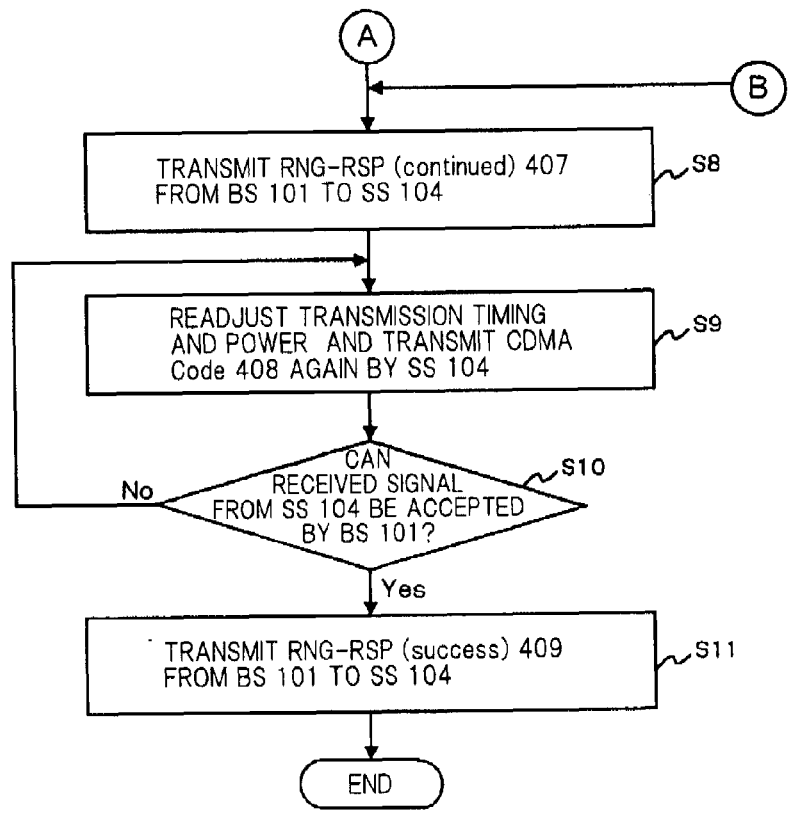
FIG. 11 a flowchart for explaining the operation of the time division multiplexing system of the first exemplary embodiment (second half)

Next, an operation of the time division multiplexing system according to this exemplary embodiment will be described. FIG. 9 is a sequence chart for explaining an example of this operation, and FIGS. 10 and 11 are flowcharts for explaining an example of this operation.

Hereinafter, communication between BS 101 and SS 104 will be described by way of example. In addition, as described above, SS 104 is placed at a position at which the initial ranging cannot be normally completed at the transmission timing which has been previously set.

First, transmitter 21 of BS 101 transmits the Down Link Map message (DL-Burst) to SS 104 via transmitter antenna 26. When receiver 12 of SS 104 receives the MAP message via receiver antenna 15 (step S403 of FIG. 9 and step S1 of FIG. 10), receiver 12 transmits the MAP message to controller 13.

When controller 13 receives the MAP message, controller 13 sets the transmission timing indicated by the schedule information in the MAP message as the initial ranging period. At the transmission timing set as the initial ranging period, controller 13 transmits the CDMA Code message from transmitter 11 via transmitter antenna 16 to BS 101 (step S404 of FIG. 9 and step S2 of FIG. 10).

Controller 13 examines whether or not receiver 12 has received the response information within the predetermined period after the CDMA Code message has been transmitted (step S3 of FIG. 10).

Here, since SS 104 is far away from BS 101, it is assumed that when the CDMA Code message has arrived at BS 101, it is past the time at which BS 101 can receive the message. In this case, BS 101 cannot receive the CDMA Code message. Hence, receiver 12 cannot receive the response information within the predetermined period after the CDMA Code message has been transmitted.

Therefore, controller 13 determines that receiver 12 has not received the response information within the predetermined period after the CDMA Code message has been transmitted (in the case of "No" at step S3 of FIG. 10), and increases the transmission power for the CDMA Code message. Controller 13 transmits the CDMA Code message from transmitter 11 via transmitter antenna 16 to BS 101 using increased transmission power (step S405 of FIG. 9 and step S4 of FIG. 10).

Again, controller 13 examines whether or not receiver 12 has received the response information within the predetermined period after the CDMA Code message has been transmitted (step S5 of FIG. 10).

Here, due to a similar reason as described above, receiver 12 cannot receive the response information within the predetermined period after the CDMA Code message has been transmitted.

Therefore, controller 13 determines that receiver 12 has not received the response information within the predetermined period after the CDMA Code message has been transmitted (in the case of "No" at step S5 of FIG. 10), and adjust the transmission timing set. Specifically, controller 13 accelerates the transmission timing. Then, controller 13 transmits the CDMA Code message from transmitter 11 via transmitter antenna 16 to BS 101 at the adjusted transmission timing (step S406 of FIG. 9 and step S6 of FIG. 10). At this time, controller 13 may increase the transmission power similarly to step S405 of FIG. 9 (step S4 of FIG. 10).

Next, controller 13 further examines whether or not receiver 12 has received the response information within the predetermined period after the CDMA Code message has been transmitted (step S7 of FIG. 10).

Since controller 13 has adjusted the transmission timing, it is assumed that the CDMA Code message has arrived at BS 101 at the time at which BS 101 can receive the message. In this case, receiver 12 receives the response information within the predetermined period after the CDMA Code message has been transmitted (in the case of "Yes" at step S7 of FIG. 10).

Specifically, receiver 22 of BS 101 receives the CDMA Code message via receiver antenna 25, and transmits the CDMA Code message to controller 23. When controller 23 receives the CDMA Code message, since controller 23 is in a state where SS 104 cannot be accepted (continued), controller 23 generates RNG-RSP (continued) (continued response information) as the response information. In addition, the state where SS 104 cannot be accepted means a state where adjustment of the transmission timing or the transmission power is required.

When controller 23 generates the RNG-RSP (continued), controller 23 transmits the RNG-RSP (continued) from transmitter 21 via transmitter antenna 26 to SS 104 (step S407 of FIG. 9 and step S8 of FIG. 11).

When receiver 12 of SS 104 receives the RNG-RSP (continued) via receiver antenna 15, receiver 12 transmits the RNG-RSP (continued) to controller 13. When controller 13 receives the RNG-RSP (continued), controller 13 adjusts the transmission timing and the transmission power for the CDMA Code message, according to the RNG-RSP (continued). Controller 13 transmits the CDMA Code message from transmitter 11 via transmitter antenna 16 to BS 101, at the transmission timing and uses the transmission power which have been adjusted (step S408 of FIG. 9 and step S9 of FIG. 11).

When receiver 22 of BS 101 receives the CDMA Code message via receiver antenna 25, receiver 22 transmits the CDMA Code message to controller 23. When controller 23 receives the CDMA Code message, controller 23 examines whether or not a received signal from SS 104 can be accepted, based on the CDMA Code message. In other words, controller 23 examines whether or not adjustment of the transmission timing and the transmission power is required for SS 104 (step S10 of FIG. 11).

In this example, it is assumed that the received signal can be accepted, that is, adjustment of transmission timing and the transmission power is not required for SS 104. In this case (in the case of "Yes" at step S10 of FIG. 11), controller 23 transmits the success response information from transmitter 21 via transmitter antenna 26 to SS 104. When receiver 12 of SS 104 receives the success response information via receiver antenna 15, receiver 12 transmits the success response information to controller 13. When controller 13 receives the success response information (step S409 of FIG. 9 and step S11 of FIG. 11), adjustment of the transmission timing and the transmission power in the initial ranging is completed.

In addition, in the case of "No" at step S10 of FIG. 11, processes at steps S9 and S10 are repeated. Moreover, respective processes at steps S4 and S6 of FIG. 10 are repeatedly performed for a predetermined number of times until the response information is received at steps S5 and S7. In addition, in the case where the response information cannot be received even if the process is repeated for the predetermined number of times, the process is completed at that point in time.

Moreover, although it has been assumed that SS 104 is the SS in which the initial ranging cannot be completed at the transmission timing which has been previously defined, in the case of the SS in which the initial ranging can be completed at the transmission timing which has been previously defined, the determination results in "Yes" at step S3 or S5 of FIG. 10. In this case, a subsequent process becomes step S8.

In addition, although it has been assumed that the number of SS is three in this exemplary embodiment, the number is not limited to three and can be changed as appropriate. In other words, the number of SS may be one or a plural number other than three.

Next, advantages will be described.

Transmitter 11 transmits the CDMA Code message to BS 101. Receiver 12 receives the response information in response to the CDMA Code message transmitted by transmitter 11. Controller 13 transmits the CDMA Code message from transmitter 11 at the transmission timing which has been previously set. Subsequently, if receiver 12 has not received the response information in response to the CDMA Code message within the predetermined period, controller 13 retransmits the CDMA Code message earlier than the transmission timing which has been previously set.

In this case, the CDMA Code message is transmitted at the transmission timing which has been previously set. Subsequently, if the response information in response to the CDMA Code message has not been received within the predetermined period, the CDMA Code message is transmitted earlier than the transmission timing which has been previously set.

Hence, even without means for measuring a receiving electric field strength or means for obtaining an initial value of the transmission timing based on the receiving electric field strength, it is possible to receive the CDMA Code message. Therefore, it is possible to prevent an apparatus configuration from being complicated when it become possible to receive the CDMA Code message.

Moreover, in this exemplary embodiment, if receiver 12 has not received the response information in response to the CDMA Code message within the predetermined period, controller 13 increases the transmission power for the CDMA Code message. Controller 13 transmits the CDMA Code message from transmitter 11 using the increased transmission power, at the transmission timing which has been previously set. Subsequently, if receiver 12 has not received the response information in response to the CDMA Code message within the predetermined period, controller 13 retransmits the CDMA Code message earlier than the transmission timing which has been previously set.

In this case, if the response information cannot be received due to low transmission power, it is possible to successfully complete the ranging without adjusting the transmission timing.

Moreover, in this exemplary embodiment, if receiver 12 has received the continued response information after the ranging request has been retransmitted, controller 13 adjusts the transmission timing based on the continued response information.

In this case, it is possible to set the transmission timing to a more appropriate value.

Moreover, in this exemplary embodiment, if receiver 22 has received the ranging request message, controller 23 determines whether or not the SS which has transmitted the ranging request message can be accepted, based on the ranging request message. If controller 23 determines that the SS can be accepted, controller 23 transmits the success response information from transmitter 21. When receiver 12 receives the success response information, controller 13 completes the ranging.

In this case, the timing at which the ranging is completed can be an appropriate timing.

Next, a second exemplary embodiment will be described.

The time division multiplexing system of this exemplary embodiment includes a function for solving a problem in which a data reception time and a data transmission time overlap in the SS, in addition to a function described in the first exemplary embodiment.

Figure 12:
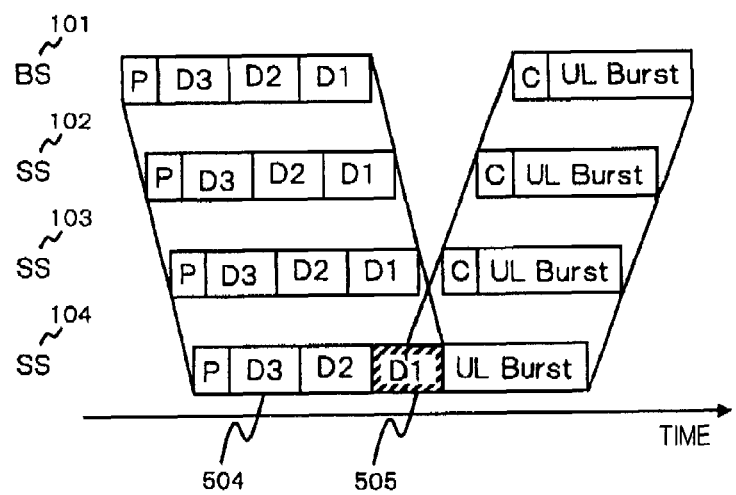
FIG. 12 is an explanatory diagram showing an example in which a data reception time and a data transmission time overlap in the SS.

FIG. 12 is an explanatory diagram showing an example in which the data reception time and the data transmission time overlap in the SS. As shown in FIG. 12, since SS 104 is far away from BS 101, SS 104 is in a state where SS 104 has to start transmission of UP Link data to BS 101 by the time that reception of Down Link data from BS 101 has been completed.

Hereinafter, the function for solving this problem will be described. In addition, the time division multiplexing system of this exemplary embodiment includes the same configuration as that shown in FIGS. 6 to 8. Hereinafter, the function added to the function of the time division multiplexing system of the first exemplary embodiment will be described.

Controller 23 of BS 101 sets a data area with respect to each SS within a Down Link frame to be transmitted to each SS. A setting method at this time is not particularly limited.

Moreover, if the reception time of receiving the data from BS 101 and the transmission time of transmitting the data to BS 101 have overlapped in each SS, controller 23 adjusts a position of the data area with respect to the SS in which the reception time and the transmission time have overlapped, to be ahead of its current position.

Specifically, first, controller 23 measures a propagation delay time between BS 101 and the SS, for each SS. In addition, since a method of measuring the propagation delay time is self-explanatory for those skilled in the art, a detailed description thereof is omitted.

Subsequently, based on the propagation delay time, controller 23 determines whether or not the data transmission time and the data reception time overlap in the SS, for each SS.

For example, controller 23 performs the following process for each SS.

First, controller 23 adds a Down Link frame transmission start time to the propagation delay time between the SS and BS 101 to obtain a frame arrival time at which the Down Link frame arrives at the SS. Controller 23 adds a time from when the SS receives the Down Link frame until the time when the SS starts transmission of an Up Link frame, to the frame arrival time to obtain an Up Link frame transmission start time. Furthermore, controller 23 adds the time required for the transmission of the Up Link frame, to the Up Link frame transmission start time to obtain an Up Link frame transmission end time.

Subsequently, controller 23 adds a transmission start time for the data area with respect to the SS within the Down Link frame, to the propagation delay time between the 8S and BS 101 to obtain a reception start time for the data area. Controller 23 adds the time required for reception of the data area, to the reception start time to obtain a reception end time for the data area.

Then, controller 23 determines whether or not a time from the transmission start time until the transmission end time (data transmission time) and a time from the reception start time until the reception end time (data reception time) overlap.

If there is an SS for which it has been determined that the data transmission time and the data reception time overlap, controller 23 adjusts the position of the data area with respect to the SS to be ahead of its current position.

Figure 13:
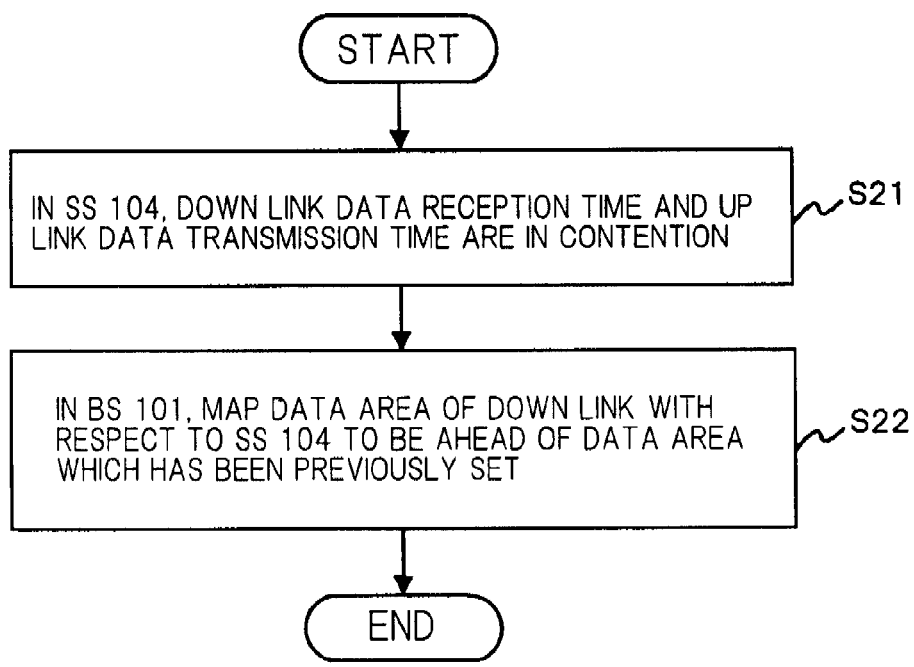
FIG. 13 is a flowchart for explaining the operation of the time division multiplexing system of a second exemplary embodiment.

Next, the operation of the time division multiplexing system of this exemplary embodiment will be described. FIG. 13 is a flowchart for explaining an example of the operation of the time division multiplexing system of this exemplary embodiment.

Controller 23 of BS 101 determines whether or not the data transmission time of SS and the data reception time of SS overlap, for each SS. Here, it is assumed that the data transmission time of SS 104 and the data reception time of SS 104 overlap If a Down Link data reception time and an Up Link data transmission time overlap in SS 104 (step S21 of FIG. 13), controller 23 adjusts the data area in the Down Link frame with respect to SS 104 to be ahead of the data area which has been previously set (step S22 of FIG. 13). For example, in FIG. 12, controller 23 adjusts data area 505 with respect to SS 104 to be data area 504. In addition, FIG. 12 shows the adjusted data areas.

Next, advantages will be described.

In this exemplary embodiment, controller 23 sets the data area with respect to each SS within a data frame to be transmitted to each SS. Moreover, if the reception time of receiving the data from BS 101 and the transmission time of transmitting the data to BS 101 have overlapped in each SS, controller 23 adjusts the position of the data area of the SS.

In this case, it is possible to eliminate the overlap of the reception time and the transmission time, and thereby it is possible to correctly receive the data. This is because even while receiving the data area with respect to another SS, the SS can transmit the Up Link frame in disregard of the reception of the data.

Moreover, in this exemplary embodiment, if the reception time and the transmission time have overlapped, controller 23 adjusts the position of the data area of the SS to be ahead of its current position.

Typically, the reception time and the transmission time overlap in the SS when the SS is far away from the BS and the data area with respect to the SS is positioned relatively behinds its current position the Down Link frame. Thus, even if the position of the data area of the SS is adjusted to be behind its current position, the overlap of the reception time and the transmission time may hot be eliminated. In this exemplary embodiment, since the position of the data area of the SS is adjusted to be ahead of its current position, it is possible to improve accurately of eliminating the overlap of the reception time and the transmission time.

While preferred exemplary embodiments of the present invention have been described using specific terms, such description is for illustrative purposes only, and it is to be understood that changes and variations may be made without departing from the spirit or scope of the following claims.

An example 1 describes a subscriber station communicable with a base station, comprising: transmit means for transmitting a ranging request message; reception means for receiving response information in response to the ranging request message transmitted by said transmit means; and control means for transmitting said ranging request message from said transmit means at a transmission timing which has been previously set, and subsequently, if said reception means has not received the response information in response to said ranging request message within a predetermined period, retransmitting said ranging request message from said transmit means earlier than said next transmission timing.

An example 2 describes The subscriber station according to example 1, wherein if said reception means has not received said response information within said predetermined period, said control means increases transmission power for said ranging request message and retransmits said ranging request message from said transmit means by using said increased transmission power, at said next transmission timing, and subsequently, if said reception means has not received said response information within said predetermined period, said control means retransmits said ranging request message from said transmit means earlier than said next transmission timing.

An example 3 describes the subscriber station according to example 1 or 2, wherein after said control means has retransmitted said ranging request message, if said reception means has received continued response information indicating continuation of ranging as said response information, said control means adjusts said transmission timing based on said continued response information.

An example 4 describes a time division multiplexing system comprising a base station and a subscriber station communicable with said base station, wherein said subscriber station comprises: transmit means for transmitting a ranging request message; reception means for receiving response information in response to the ranging request message transmitted by said transmit means; and control means for transmitting said ranging request message from said transmit means at a transmission timing which has been previously set, and subsequently, if said reception means has not received the response information in response to said ranging request message within a predetermined period, retransmitting said ranging request message from said transmit means earlier than said next transmission timing, and said base station comprises: base station transmit means; base station reception means for receiving said ranging request message; and base station control means for, if said base station reception means has received said ranging request message, transmitting said response information from said base station transmit means.

An example 5 describes the time division multiplexing system according to example 4, wherein if said reception means has not received said response information within said predetermined period, said control means increases transmission power for said ranging request message and retransmits said ranging request message from said transmit means using said increased transmission power, at said next transmission timing, and subsequently, if said reception has not received said response information within said predetermined period, said control means retransmits said ranging request message from said transmit means earlier than said next transmission timing.

An example 6 describes the time division multiplexing system according to example 4 or 5, wherein said base station control means sets a data area with respect to said subscriber station within a data frame to be transmitted to said subscriber station, and if a reception time of receiving data from said base station and a transmission time of transmitting the data to said base station have overlapped in said subscriber station, said base station control means adjusts a position of said data area.

An example 7 describes the time division multiplexing system according to example 6, wherein if said reception time and said transmission time have overlapped, said base station control means adjusts the position of said data area to be ahead of its current position.

An example 8 describes the time division multiplexing system according to any one of examples 4 to 7, wherein if said base station reception means has received said ranging request message, said base station control means determines whether or not said subscriber station can be accepted, based on said ranging request message, and if said base station control means determines that said subscriber station can be accepted, said base station control means transmits success response information indicating success of ranging as said response information, from said base station transmit means; and if said reception means has received said success response information, said control means completes the ranging.

An example 9 describes a transmission timing control method by a subscriber station communicable with a base station, comprising: transmitting a ranging request message at a transmission timing which has been previously set; and subsequently, if response information in response to said ranging request message has not been received within a predetermined period, retransmitting said ranging request message earlier than said next transmission timing.

An example 10 describes the transmission timing control method according to example 9, further comprising: if said response information has not been received within said predetermined period, increasing transmission power for said ranging request message, and retransmitting said ranging request message using said increased transmission power, at said next transmission timing; and subsequently, if said response information has not been received within said predetermined period, retransmitting said ranging request message earlier than said next transmission timing.

An example 11 describes the transmission timing control method according to example 9 or 10, further comprising: after said ranging request message has been retransmitted, if continued response information indicating continuation of ranging has been received as said response information, adjusting said transmission timing based on said continued response information.

An example 12 describes a transmission timing control method by a time division multiplexing system comprising a base station and a subscriber station communicable with said base station, wherein said subscriber station transmits a ranging request message; if said base station has received said ranging request message, said base station transmits response information in response to said ranging request; and after said subscriber station has transmitted said ranging request, if said subscriber station has not received said response information within a predetermined period, said subscriber station retransmits said ranging request message earlier than said next transmission timing.

An example 13 describes the transmission timing control method according to example 12, wherein if said subscriber station has not received said response information within said predetermined period, said subscriber station increases transmission power for said ranging request message, and retransmits said ranging request message using said increased transmission power, at said next transmission timing; and after said ranging request message has been retransmitted, if said subscriber station has not received said response information within said predetermined period, said subscriber station retransmits said ranging request message earlier than said next transmission timing.

An example 14 describes the transmission timing control method according to example 12 or 13, wherein said base station sets a data area with respect to said subscriber station within a data frame to be transmitted to said subscriber station; and if a reception time of receiving data from said base station and a transmission time of transmitting the data to said base station have overlapped in said subscriber station, said base station adjusts a position of said data area.

An example 15 describes the transmission timing control method according to example 14, wherein if said reception time and said transmission time have overlapped, said base station adjusts the position of said data area to be ahead of its current position.

An example 16 describes the transmission timing control method according to any one of examples 12 to 15, wherein if said base station has received said ranging request message, said base station determines whether or not said subscriber station can be accepted, based on said ranging request message; if it is determined that said subscriber station can be accepted, said base station transmits success response information indicating success of ranging as said response information; and if said subscriber station has received said success response information, said subscriber station completes the ranging.

An example 17 describes a program for causing a computer connected to a base station to execute: a procedure of transmitting a ranging request message at a transmission timing which has been previously set; and a procedure of, after said ranging request has been transmitted, if response information in response to said ranging request message has not been received within a predetermined period, retransmitting said ranging request message earlier than said next transmission timing.

An example 18 describes the program according to example 17, wherein said program further causes said computer to execute: a procedure of, if said response information has not been received within said predetermined period, increasing transmission power for said ranging request message; a procedure of retransmitting said ranging request message using said increased transmission power, at said next transmission timing; and a procedure of, after said ranging request has been retransmitted, if said response information has not been received within said predetermined period, retransmitting said ranging request message earlier than said next transmission timing.

What is claimed is:

1. A time division multiplexing system comprising a base station and a subscriber station communicable with said base station, wherein said subscriber station comprises:
a transmitter that transmits a ranging request message;
a receiver that receives response information in response to the ranging request message transmitted by said transmitter; and
a controller that transmits said ranging request message from said transmitter at a transmission timing which has been previously set, and subsequently, if said receiver has not received the response information in response to said ranging request message within a predetermined period, retransmits said ranging request message from said transmitter earlier than a next transmission timing which has been previously set, and said base station comprises:
a base station transmitter;
a base station receiver that receives said ranging request message; and
a base station controller that, if said base station receiver has received said ranging request message, transmits said response information from said base station transmitter, wherein said base station controller sets a data area with respect to said subscriber station within a data frame to be transmitted to said subscriber station, and said base station controller adjusts a position of said data area if a reception time of receiving data from said base station and a transmission time of transmitting the data to said base station have overlapped in said subscriber station.

2. The time division multiplexing system according to claim 1, wherein if said receiver has not received said response information within said predetermined period, said controller increases transmission power for said ranging request message and retransmits said ranging request message from said transmitter using said increased transmission power, at said next transmission timing, and subsequently, if said receiver has not received said response information within said predetermined period, said controller retransmits said ranging request message from said transmitter earlier than a third transmission timing which has been previously set.

3. The time division multiplexing system according to claim 1, wherein if said reception time and said transmission time have overlapped, said base station controller adjusts the position of said data area to be ahead of its current position.

4. The time division multiplexing system according to claim 1, wherein if said base station receiver has received said ranging request message, said base station controller determines whether or not said subscriber station can be accepted, based on said ranging request message, and if said base station controller determines that said subscriber station can be accepted, said base station controller transmits success response information indicating success of ranging as said response information, from said base station transmitter; and if said receiver has received said success response information, said controller completes the ranging.

5. A transmission timing control method by a time division multiplexing system comprising a base station and a subscriber station communicable with said base station, wherein said subscriber station transmits a ranging request message;

if said base station has received said ranging request message, said base station transmits response information in response to said ranging request; and after said subscriber station has transmitted said ranging request, if said subscriber station has not received said response information within a predetermined period, said subscriber station retransmits said ranging request message earlier than a next transmission timing which has been previously set, wherein said base station sets a data area with respect to said subscriber station within a data frame to be transmitted to said subscriber station; and said base station adjusts a position of said data area if a reception time of receiving data from said base station and a transmission time of transmitting the data to said base station have overlapped in said subscriber station.

6. The transmission timing control method according to claim 5, wherein if said subscriber station has not received said response information within said predetermined period, said subscriber station increases transmission power for said ranging request message, and retransmits said ranging request message using said increased transmission power, at said next transmission timing; and after said ranging request message has been retransmitted, if said subscriber station has not received said response information within said predetermined period, said subscriber station retransmits said ranging request message earlier than a third transmission timing which has been previously set.

7. The transmission timing control method according to claim 5, wherein if said reception time and said transmission time have overlapped, said base station adjusts the position of said data area to be ahead of its current position.

8. The transmission timing control method according to claim 5, wherein if said base station has received said ranging request message, said base station determines whether or not said subscriber station can be accepted, based on said ranging request message;

if it is determined that said subscriber station can be accepted, said base station transmits success response information indicating success of ranging as said response information; and if said subscriber station has received said success response information, said subscriber station completes the ranging.

* * * * *